No. 670,808. Patented Mar. 26, 1901.
J. C. PERRY.
METHOD OF ELECTRIC WELDING.
(Application filed Sept. 15, 1899.)
(No Model.)
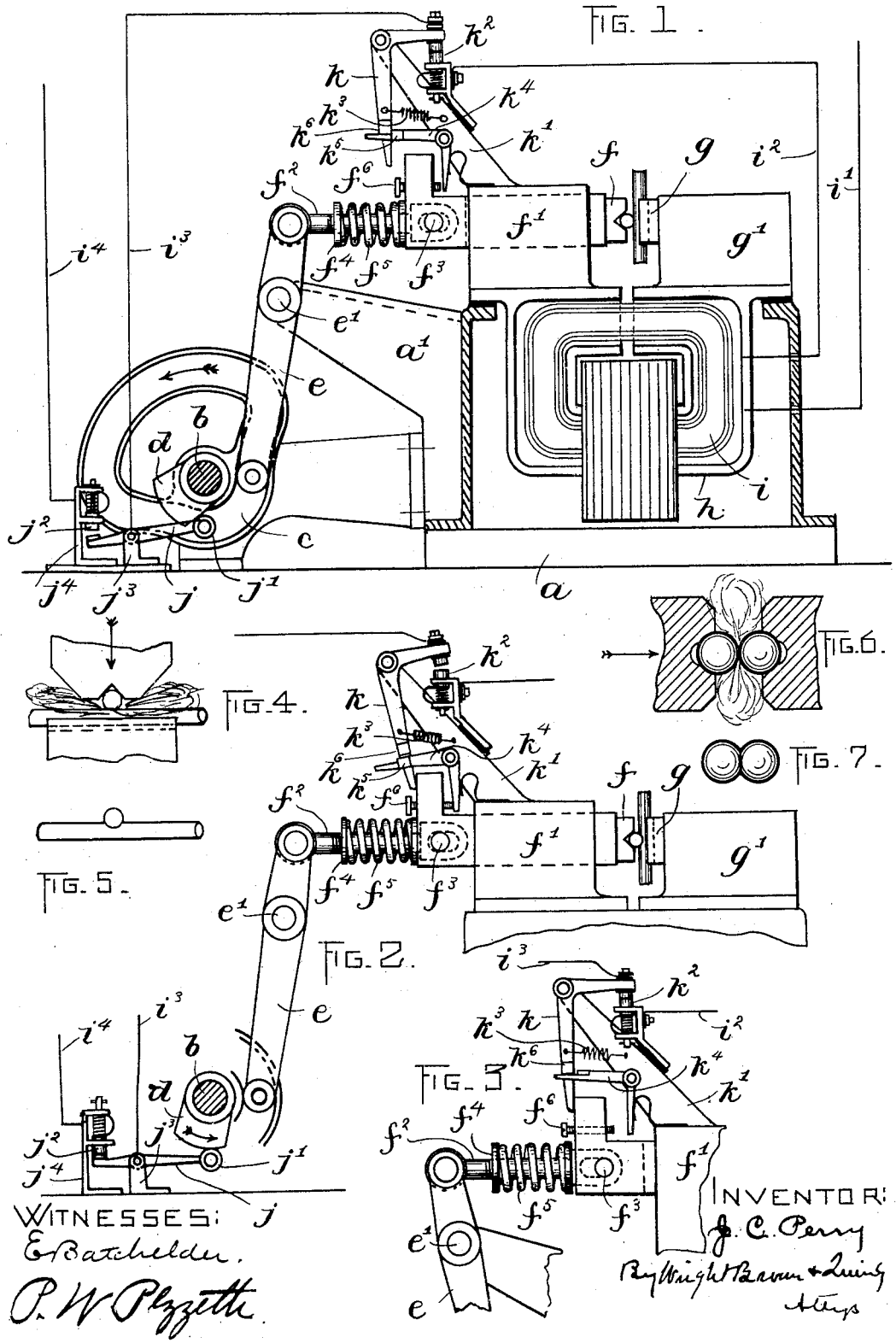
WITNESSES:
E. Batchelder.
P. W. Pezzetti.
INVENTOR:
J. C. Perry
By Wright Brown & Quinby
Attys

UNITED STATES PATENT OFFICE.

JOHN C. PERRY, OF CLINTON, MASSACHUSETTS.

METHOD OF ELECTRIC WELDING.

SPECIFICATION forming part of Letters Patent No. 670,808, dated March 26, 1901.

Application filed September 15, 1899. Serial No. 730,554. (No specimens.)

*To all whom it may concern:*

Be it known that I, JOHN C. PERRY, of Clinton, in the county of Worcester and State of Massachusetts, have invented certain new and useful Improvements in Methods of Making Welds Electrically, of which the following is a specification.

This invention relates to a new and improved method for making welds electrically.

Reference is to be had to the accompanying sheet of drawings, forming a part of this specification, in which like characters of reference are used to indicate like parts wherever they occur.

Figure 1 represents in side elevation a section of a machine embodying my invention and shows a transformer, the pressure device, and the switches, and also the connecting-wires for completing the primary circuit. Fig. 2 represents in side elevation a detailed view of the machine, showing the position of the automatic switches after the completion of the weld. Fig. 3 is a substantially similar view showing the plunger in position to reset or lock in position the automatic circuit-breaker. Fig. 4 represents two parts when being welded together, with the envelop of vapor surrounding the joint exaggerated for the purposes of illustration. Fig. 5 shows the parts after the weld is completed. Fig. 6 represents two spherical bodies in the act of being welded. Fig. 7 shows the same when the weld is completed.

By my invention the welds are made instantaneously without any appreciable heating of the material adjacent to the point of the weld, and my improved method consists in the simultaneous application to the parts to be joined or welded of a mechanical pressure nearly equal to the crushing strength of the material and a current of electricity of relatively enormous volume. By using a mechanical pressure nearly equal to the crushing strength of the material I insure the parts being forced together the instant they soften, and by the employment of a current of electricity of relatively enormous volume compared with the area of contact of the parts to be welded I am enabled to produce an instantaneous heating or softening of the metal. The welding-current is much stronger than has heretofore been considered suitable, being from one to two hundred thousand amperes to a square inch, while the mechanical pressure of the electrodes for forcing the heated parts together is nearly equal to the crushing strength of the material being welded when cool. As a result of this the parts to be welded are first brought into intimate contact, and immediately thereafter the circuit is closed between the electrodes. The current is of such strength that the contacting parts of the said members become heated to a fusing-point immediately, and as soon as the metal sufficiently softens, so that its resistance is less than the force of the compression spring or weight, such spring or weight forces the movable electrode farther toward the stationary electrode to weld the parts together. Immediately after this compression the circuit is broken and before the heat is spread away from the contacting surfaces. Consequently the metal cannot be overheated or blown out. As the electrodes are relatively of large volume or area compared to the contacting metal to be welded, there is no necessity for artificial cooling. Further, by my invention two parts covered with a coating of metal fusible at a lower temperature than said parts can be readily welded— as, for instance, iron wire covered with a coating of zinc, as shown in Figs. 4 and 5. When the said parts to be welded are brought into contact, their contacting surfaces are of a relatively small area at the beginning of the operation and the area increases as the metals are compressed together.

It is obvious that since the coating of the parts to be joined is fusible at a temperature lower than the fusing-point of the body coated thereby said covering will be volatilized if the welding operation consume any considerable portion of time, and the covering at the weld will be removed and in case of iron the exposed part liable to rust. In accordance with my invention, however, the weld is practically instantaneous and the heat is localized at the point of contact between the two parts, so that only the coating at the point of contact is volatilized or disturbed, thus forming an envelop surrounding the weld, as portrayed in Figs. 4 and 6, to prevent access of air thereto and consequent oxidation, the rapidity of the weld being such that the heat does not spread through the coating over such surfaces as are not brought into contact and welded together. The circuit is broken immediately upon the completion of the weld, so that the envelop of gas or vapor is chilled instantaneously and a portion of the said coating material is redeposited at the joint, oxidation being prevented by the outside portions of this vapor or gas. When heavy welds are made by this process, so that the fillet or bur of highly-heated metal is forced out of the joint, it is covered when of iron by a thin film of magnetite or magnetic oxid and is rust-proof.

As stated, in following out my process or method all of the contacting portions of the electrodes are made very large to permit the flow of the heavy current over the parts to be welded without injuring the covering of zinc or other material and also to assist in keeping the parts adjacent to the weld cool. By my invention the joints formed by the weld when the parts have the described coating are fully covered and protected by the zinc covering, for when two bodies covered with a coating fusible at a relatively low temperature are welded together by my method the covering is practically uninjured about the joint, and the joint is thus rust-proof. Further, by my invention two parts (of which one is under tension) can be readily welded, for, although the abutting or contacting portions thereof reach a high temperature for an instant, the heat is localized about said surfaces and does not extend through the entire body of the said parts, thus preventing the body from being stretched, elongated, or bent at the weld or dominated by the described stress or strain, as would be the case if the welding operation were continued, as was done prior to my invention, over such a period of time that the entire body of the metal became heated and softened, so that it would be affected by such stress or strain, for by my invention merely the contacting surfaces are softened.

While my invention may be carried out in many ways, I prefer for simplicity of construction the means shown in the drawings, which are herein illustrated in order to disclose the mechanism by which my improved method may be practiced.

$a$ represents a part of the framework of the machine, said frame being formed in any desirable way and supported upon suitable legs or standards; but inasmuch as the construction of the framework forms no material part of my invention it is unnecessary to describe it in detail.

$b$ indicates a shaft which is driven in any suitable way and on which is secured a path-cam $c$ and also a cam $d$. The path-cam actuates a lever $e$, fulcrumed at $e'$ on a bracket $a'$, forming a part of the framework, said lever being constructed and arranged to cause the actuation of a movable electrode $f$. Said electrode $f$, together with that indicated at $g$, is mounted in a suitable manner upon and insulated from the framework. The brackets $f'$ $g'$, which support said electrodes, form a part of the secondary circuit (indicated at $h$) and the primary circuit, including the coils $i$ and the wires $i'$ $i^2$ $i^3$ $i^4$. The movable electrode $f$ is connected to the upper end of the lever $e$ by a connecting-rod $f^2$, which is slotted at its end to receive the pin $f^3$, passed crosswise through the plunger, of which the movable electrode forms a part, and between the end of the plunger and a collar $f^4$, adjustably secured upon the rod $f^2$, there is a powerful compression-spring $f^5$.

When two parts to be welded together according to my invention are placed between the electrodes and the cam $c$ actuates the lever $e$, the electrodes clamp the said parts with a pressure a little less than the crushing strength of the metal of which the parts are formed, the spring $f^5$ being compressed when the resistance of the said parts becomes greater than the strength of the said spring, and after the contacting surfaces of the parts become softened the spring $f^5$ instantly and automatically forces the said parts into intimate contact to complete the weld, as shown in Figs. 5 and 7, and thus automatically breaks the circuit.

I so arrange the apparatus that the primary circuit is closed immediately after the clamping of the parts between the electrodes, and the circuit is broken when the movable electrode is pushed forward after the metal has become sufficiently softened to complete the weld or pushed to the limit of its forward movement, the whole operation taking place in a very short duration of time and the weld being practically instantaneous.

The circuit-closer is actuated automatically from the shaft $b$ by the cam $d$, and it consists of the switch-lever $j$, having a roller $j'$ bearing against said cam $d$ and having its other end adapted to bear against the sufficiently-yielding contact $j^2$. The movable contact or switch-lever $j$ is fulcrumed on a bracket $j^3$, suitably mounted on the framework, while the yielding stationary contact $j^2$ is supported in a bracket $j^4$. It is understood, of course, that the brackets in the lever $j$ are suitably insulated from the rest of the machine, being included in the primary circuit.

The circuit-breaker is operated automatically by the movable electrode, as previously stated, and comprises the following elements: An elbow-lever $k$ is fulcrumed upon a bracket $k'$, supported by and insulated from the bracket $f'$, and it constitutes a movable contact being connected with the wire $i^3$, and consequently with the switch-lever $j$. The stationary yielding contact $k^2$ is supported upon and insulated upon the bracket $k'$ and is electrically connected with the wire $i^2$. A spring $k^3$ tends to break the circuit or to move the movable contacts from the stationary contacts $k^2$; but this tendency of the springs is overcome or prevented by a second elbow-lever $k^4$, fulcrumed upon the bracket $k'$ and having a knife-edge $k^5$, which engages a similar edge $k^6$ on the end of one of the arms of the elbow-lever $k$. The lever $k^4$ has an arm projecting downwardly into the path of an adjustable screw $f^6$ on the movable plunger or electrode $f$, and the parts are so adjusted at the final movement of the movable electrode upon the softening of the parts to be welded that the adjusting-screw $f^6$ engages the lever $k^4$ and disengages it from the movable switch-lever $k$, so that it permits the spring $k^3$ to break the circuit by swinging the movable contact away from the stationary contact $k^2$.

Manifestly the parts of the mechanism before described may be variously modified, and my improved method may be followed in making welds of various kinds without departing at all from the spirit or scope of my invention, which consists, as heretofore stated, in the simultaneous application to the parts to be joined of a mechanical pressure nearly equal to the crushing strength of the material and a current of electricity of relatively enormous volume.

This invention, as stated, I believe to be broadly new with me, and I desire to claim and to be understood as claiming the same in the broadest possible manner.

Having thus explained the nature of my invention and described a way of constructing and using the same, though without attempting to set forth all of the forms in which it may be made or all of the modes of its use, what I claim, and desire to secure by Letters Patent, is—

1. The method of making welds electrically, consisting of the simultaneous application to the parts to be joined of a mechanical pressure nearly equal to the crushing strength of the material to be welded, and of a current of electricity of relatively enormous volume, and subsequently and automatically breaking the circuit.

2. The method of welding coated wire which consists in localizing the heat at the point of contact to form about the joint a protective envelop of gas from the coating at the point of contact, and completing the weld while the joint is protected by said envelop and before the coating about the joint is destroyed.

3. The method of electrically welding parts having a coating of a relatively low melting temperature, which consists in applying to said parts a relatively enormous pressure, applying a current of electricity to said parts at their point of contact of relatively enormous volume and arranging said pressure to automatically force said parts together after the material softens, and thereafter break the circuit to volatilize the coating at the point of contact, to form an envelop about the weld and complete the weld before the heating action extends beyond the point of the weld or joint sufficiently to destroy the coating surrounding the joint.

In testimony whereof I have affixed my signature in presence of two witnesses.

JOHN C. PERRY.

Witnesses:
 E. BATCHELDER,
 CORNELIUS BEARD, Jr.